Dec. 10, 1929.  F. H. HUNTWORTH  1,739,144
VEHICLE HEADLIGHT REGULATOR
Filed Jan. 26, 1928
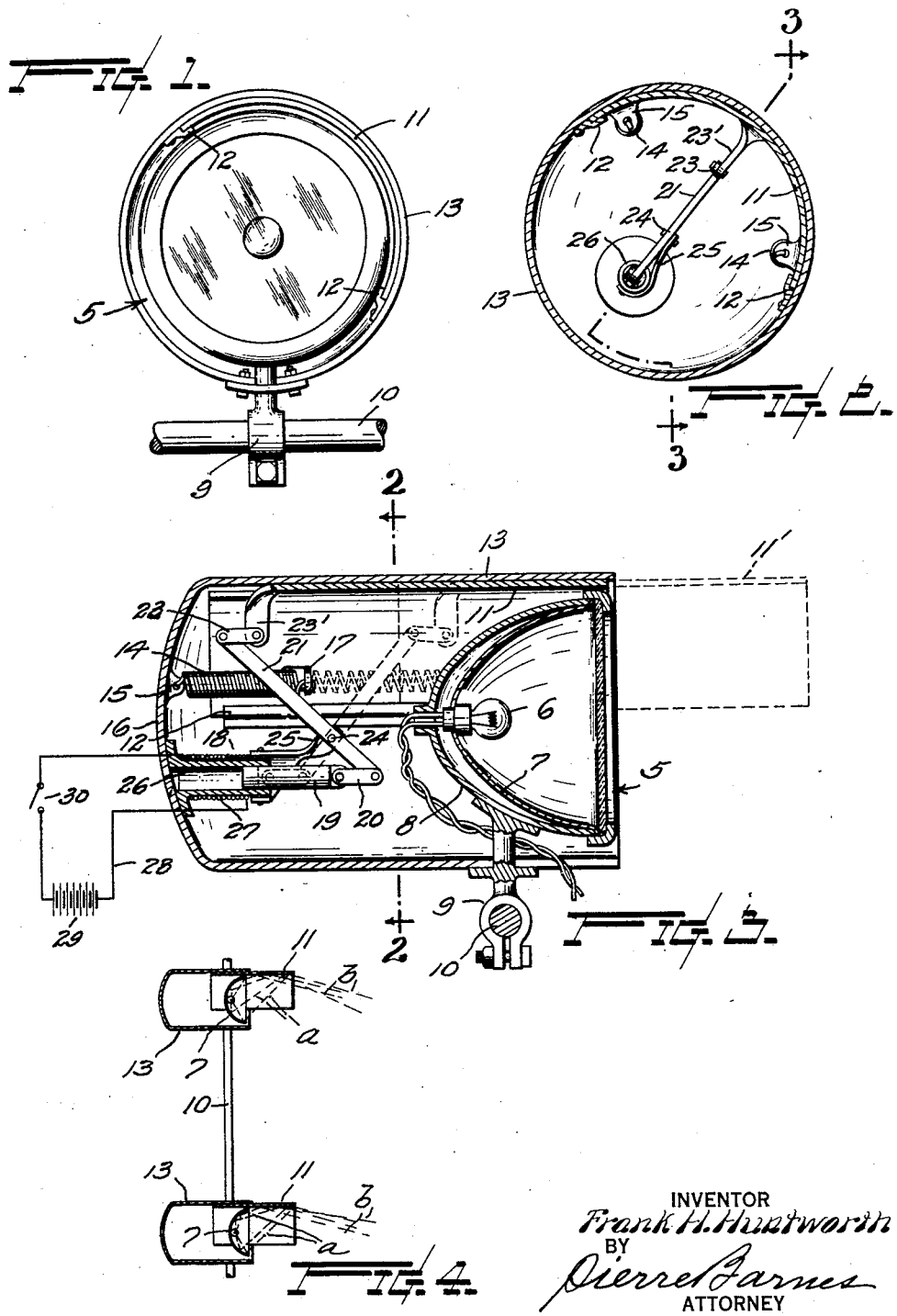

Patented Dec. 10, 1929

1,739,144

UNITED STATES PATENT OFFICE

FRANK H. HUNTWORTH, OF SEATTLE, WASHINGTON

VEHICLE HEADLIGHT REGULATOR

Application filed January 26, 1928. Serial No. 249,580.

This invention relates to light regulating devices for headlights of automobiles and the like.

The principal object of the invention is to provide devices which are adapted to effectually intercept light rays from the headlight lamp to prevent the same from shining in the eyes of the driver of a passing car on a roadway.

Another object is to provide a light interceptor of this character which will serve to reflect the intercepted light rays for the purpose of illuminating more effectually the roadway to the right of the vehicle to enable the latter being driven with added safety closer to the curb or margin of the road and thus afford more space or room to the left hand side of the car for the passage of another vehicle.

Another object is to provide a simply constructed, durable and efficient light interceptor and reflector which is adapted to be actuated by power under the control of the driver of a car.

More specific objects and advantages of the invention will appear in the following description.

The invention consists in the novel construction, adaptation and combination of parts hereinafter described and claimed.

In the accompanying drawing,—

Figure 1 is a front elevation of an automobile headlight with devices embodying the present invention applied thereto; Fig. 2 is a transverse vertical section thereof, said section being taken substantially on line 2—2 of Fig. 3; Fig. 3 is a longitudinal section on broken line 3—3 of Fig. 2; and Fig. 4 is a horizontal section, shown somewhat diagrammatically of a pair of companion headlights with the vizors illustrated in protruding positions.

Referring more particularly to Figs. 1, 2, and 3, the reference numeral 5 represents an automobile headlight comprising an incandescent lamp 6, a reflector 7 therefor, enclosed in a casing 8 and supported by means of a bracket 9 from some part of the chassis of a car as, for example, a transverse rod element 10, all of known or suitable construction.

According to the present invention, I provide for said headlight a vizor 11 comprising a metal plate disposed to the left hand side and above the casing 8 and arranged for movement longitudinally thereof.

In transverse section the vizor is of the form of a segment of a cylindrical tube with its center of curvature coincident with the axis of the headlight, or nearly so.

Said vizor is mounted for movement in guides 12 provided interiorly of a cylindrical housing 13 secured to said bracket or other rigid support, the front end of the housing being open to accommodate the headlight as shown in Fig. 3. Said vizor is normally held in its sheathed position within the housing by means of one or more retractile springs 14, two being shown, which are connected to lugs, as 15, provided upon the rear end wall 16 of said housing and to apertured ear elements such as 17 of the vizor.

For moving the vizor to protrude the same forwardly from the housing as indicated by dotted lines $11^1$ in Fig. 3 and by full lines in Fig. 4, I provide power actuated devices which as illustrated in Fig. 3 comprises an electric solenoid magnet 18 having an armature 19 which is operatively connected by means of a link 20 with a lever 21 which, in turn, is connected by a link 23 with a lug element $23^1$ of the vizor.

As illustrated the fulcrum pin 24 for the lever 21 is supported by an attachment 25 of the spool 26 of the magnet winding 27. Said magnet winding is included in a normally open electric circuit 28 having a battery 29, the switch 30 being located in the vehicle to be within convenient reach of the operator.

For operating the device to protrude the vizor 11, the electric circuit 28 is completed by closing the switch 30 whereupon the magnet is energized to cause the armature 19 thereof to be drawn rearwardly, thereby influencing the lever 21 to move the vizor into its operative position in which it is indicated by dotted lines $11^1$ in Fig. 3.

When the switch 30 is opened the magnet 18 becomes deenergized permitting the springs 14 to effect the return of the vizor into its normal retracted position—sheathed within the housing—in which position the vizor is represented by full lines in Fig. 3.

In practice, a vizor as above described, with the operating and controlling devices and the housing therefor is applied to each of the pair of headlights of an automobile.

For illustrating the functions of the invention I show in Fig. 4 a diagrammatic view of the reflectors 7 of companion headlights, and the associated vizors 11 and housings 13. In this view, the vizors are represented as extended and in such positions, by reason of their being arranged to the left hand sides and above the axes of the respective lamps the vizors serve not only to intercept the light rays—either direct from the lamps or the rays reflected by the reflectors 7—which would bother the eyes of the driver of an approaching car, but deflect the said light rays to the right hand curb portion of the roadway, enabling the driver to direct and safely operate his car in closer proximity to the road edge in allowing the oncoming automobile an ample portion of the road in which to pass.

When thus extended, the vizors not only serve as interceptors of troublesome light rays but also serve as reflectors to divert light rays downwardly toward the right for illuminating the roadway at that side of the car which is equipped with my device. This will be understood from an inspection of Fig. 4 wherein light rays from the incandescent lamps, either direct or when reflected by the reflectors of the headlights proper, as denoted by a, are intercepted by the respective vizors, and in being thus intercepted, are reflected downwardly and toward the right hand side by the concave sides of the vizors into diverging rays which are denoted by b.

The lower or concave side of a vizor is silvered or otherwise adapted to effectually serve as a reflector for light rays.

While I have illustrated and described the devices now preferred by me for regulating the relative positions of the vizor, I do not wish to confine myself specifically thereto except as limited by the following claims.

What I claim, is:—

1. A light intercepting and reflecting device adapted to be used with an automobile headlight, said device comprising a cylindrical housing adapted to receive the headlight in one end thereof, a vizor having a straight longitudinal section and a transverse vertical section of substantially the shape of a segment of a circle, means provided interiorly of said housing for guiding the vizor for rectilineal movement parallel with the axis of the housing, power actuated means for effecting the forward movement of the vizor, means for manually controlling said power means to render the same operative and inoperative selectively, and means for effecting rearward movement of the vizor into a concealed position within the housing.

2. A light intercepting and reflecting device adapted to be used with an automobile headlight, said device comprising a cylindrical housing adapted to receive the headlight in one end thereof, a vizor, means provided interiorly of said housing for guiding the vizor for rectilineal movement parallel with the axis of the housing, power actuated means for effecting the forward movement of the vizor, means for manually controlling said power means to render the same operative and inoperative selectively, and means for effecting rearward movement of the vizor into a concealed position within the housing.

3. A light intercepting and reflecting device for use with a headlight, said device comprising a cylindrical housing adapted to receive the headlight in one end thereof, a vizor, guide means for said vizor disposed interiorly of the housing and arranged to guide said vizor in rectilineal movement parallel to the axis of the housing, means for effecting the forward movement of the vizor to protrude a portion of said vizor beyond the plane of the face of the headlight, and means for effecting rearward movement of the vizor into a concealed position within the housing.

4. A light intercepting and reflecting device adapted to be used with an automobile headlight, said device comprising a cylindrical housing adapted to receive the headlight in one end thereof, a vizor, longitudinally disposed guides for said vizor in said housing, resilient means for yieldably retaining the vizor in its rearmost position, and normally controlled means for effecting forward movement of the vizor in a rectilineal line longitudinally of the axis of the housing in opposition to said resilient means to protrude a portion of said vizor beyond the plane of the face of the headlight.

5. A light intercepting and reflecting device for use with a headlight, said device comprising a housing rigidly arranged over a headlight, said housing having a straight longitudinal section and an arcuate transverse vertical section, a vizor, means provided by said housing for guiding said vizor in rectilineal movement parallel to the axis of the housing, means for retaining the vizor in its rearmost inoperative position, and means for effecting forward operative movement to the vizor to protrude a portion of the vizor beyond the plane of the face of the headlight.

Signed at Seattle, Washington, this 11th day of January, 1928.

FRANK H. HUNTWORTH.